United States Patent

[11] 3,603,277

[72] Inventors Leslie R. Manary
 6424 North Burr St., Portland, Oreg. 97203;
 Alexander E. Frederick, Rte. 1 Box 36, Portland, Oreg. 97231
[21] Appl. No. 832,345
[22] Filed June 11, 1969
[45] Patented Sept. 7, 1971

[54] SPEED CONTROL FOR BOATS
 9 Claims, 5 Drawing Figs.
[52] U.S. Cl. .................................................... 114/145 A
[51] Int. Cl. ........................................................ B63h 25/44
[50] Field of Search .......................................... 144/145.1; 115/17

[56] References Cited
 UNITED STATES PATENTS
2,914,019 11/1959 Gewin .......................... 114/145 (.1)
2,984,203 5/1961 Canning ....................... 114/145 X Primary Examiner—Andrew H. Farrell
Attorneys—Clarence A. O'Brien and Harvey B. Jacobson ABSTRACT: A trolling plate or speed retarder for use on the outdrive unit of an inboard-outboard drive assembly. The speed retarder includes a guide for attachment to the outdrive unit and also an upstanding panel assembly supported from the guide unit for vertical shifting between an upper inoperative position with the lower end portion of the panel assembly disposed above a horizontal plane containing the cavitation plate of the outdrive unit and a lower operative position with the lower end portion of the panel assembly terminating downwardly adjacent a horizontal plane containing the lower most extremity of the outdrive unit and disposed rearwardly of the propeller of the unit.

PATENTED SEP 7 1971

Leslie R. Manary
Alexander E. Fredrick
INVENTORS

BY *Clarence A. O'Brien*
and *Harvey B. Jacobson*
Attorneys

PATENTED SEP 7 1971
3,603,277
SHEET 2 OF 2
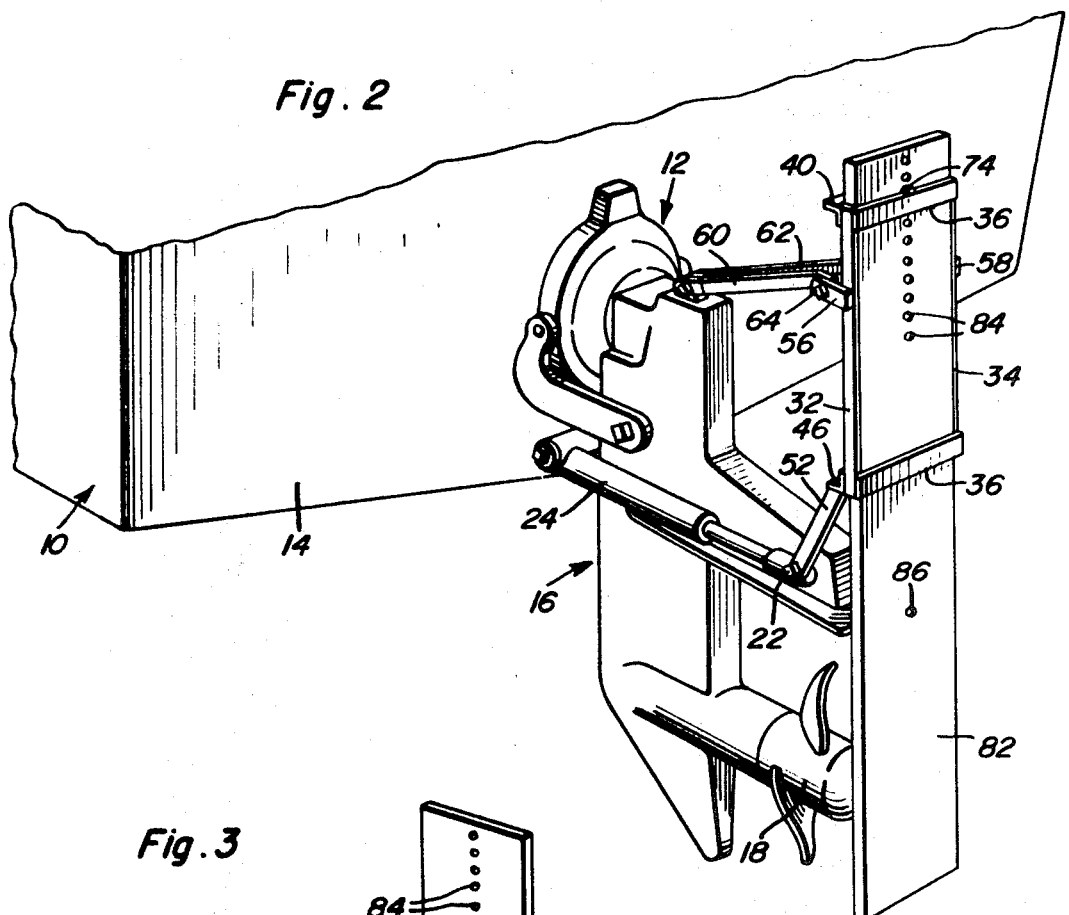
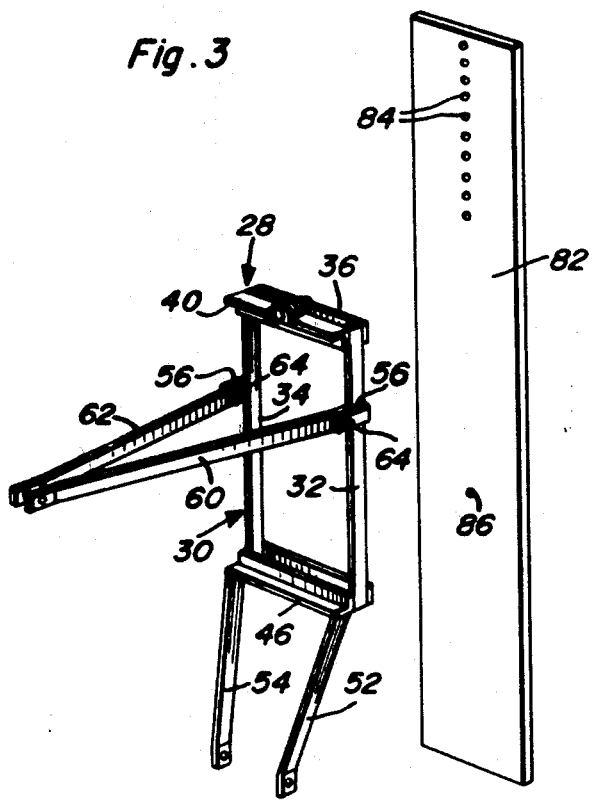
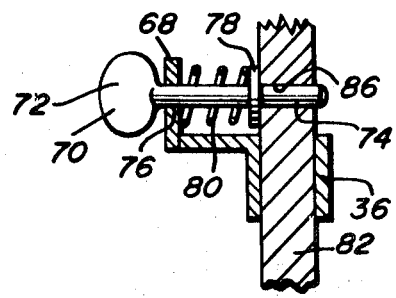
Leslie R. Manary
Alexander E. Fredrick
INVENTORS
BY *Clarence A O'Brien*
*and Harvey B. Jacobson*
Attorneys

SPEED CONTROL FOR BOATS

Many forms of intermediate size motorboats, and especially those capable of relatively high speeds and provided with only one engine driving a single marine propeller, are utilized, at least occasionally, for fishing purposes. When a motorboat of this type is used for fishing and the persons who are to fish desire to troll, it is sometimes difficult to cause the motorboat to travel at a speed which is slow enough to troll. Because of the high power-to-weight ratio of single engine motorboats capable of relatively high speeds and the type of marine propeller provided on such motorboats, trolling speeds are difficult to obtain, inasmuch as the propeller will drive the motorboat at a speed faster than trolling speed, even when the engine driving the propeller is operating at idle speed.

It is accordingly the main object of this invention to provide an effective means of reducing the minimum speed of single engine medium size motorboats capable of relatively high speeds.

Although the speed control of the instant invention illustrated and described hereinafter may be utilized on boats with dual engines, inasmuch as such boats are usually provided with maximum sized engines which each is considerably less powerful than the maximum single installation which might be provided on the same boat and the minimum speed of a dual engine boat operating on only one engine is appreciably less than minimum speed of that boat operating on both engines, the speed control of the instant invention is most advantageously utilized on a boat having a single engine only.

Another object of this invention is to provide a speed control attachment for the outdrive unit of an inboard-outboard drive assembly and which may be readily removably attached to the drive assembly.

Still another object of this invention is to provide a speed control for attachment to the outdrive unit of an inboard-outboard drive assembly and which may be readily adjusted while on the associated outboard drive assembly between operative and inoperative positions, thus making it unnecessary to remove the speed control from the outboard drive assembly when the speed controlling function of the speed control is not desired.

Another important object of this invention is to provide a speed control in accordance with the preceding objects and which may be readily removably supported from an associated inboard-outboard drive assembly without necessitating permanent modifications of the drive assembly.

A final object of this invention to be specifically enumerated herein is to provide a speed control in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a fragmentary perspective view similar to FIG. 1 but illustrating the panel assembly of the speed control in a lowered active position;

FIG. 3 is a perspective view of the speed control with the panel assembly thereof in exploded position;

FIG. 5 is a fragmentary enlarged vertical sectional view taken substantially upon a plane passing through the center of the adjustment pin of the speed control by which the panel assembly thereof may be retained in adjusted vertically shifted positions.

Figure 1:
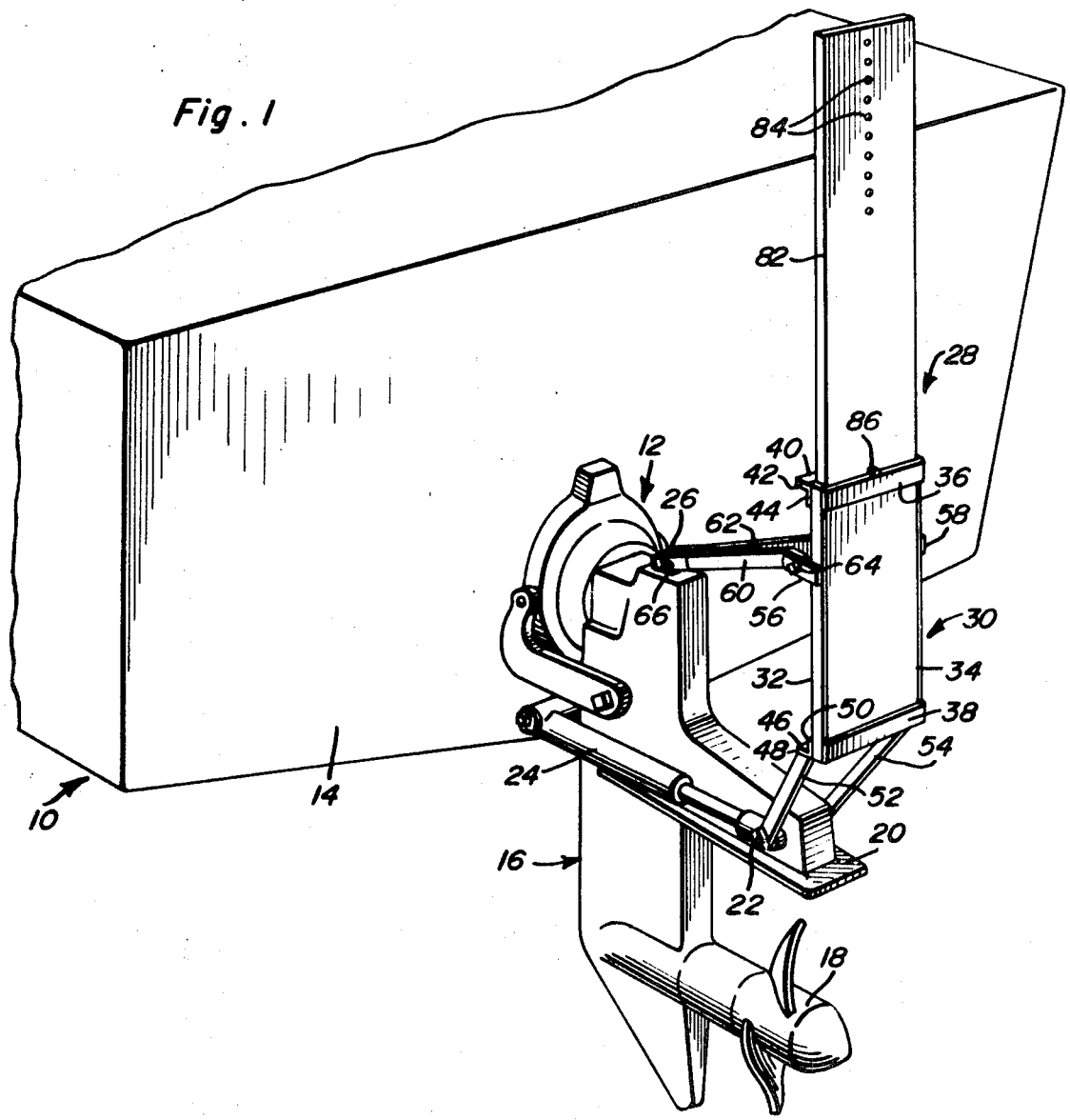
FIG. 1 is a fragmentary perspective view of the aft portion of an inboard-outboard motorboat with the speed control of the instant invention illustrated operatively supported from the drive assembly and the panel portion of the speed control in an elevated inactive position.
Figure 4:
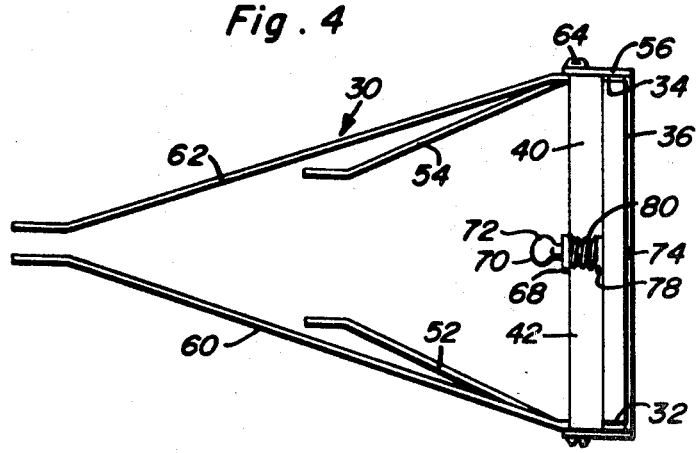
FIG. 4 is a top plan view of the speed control illustrated in FIGS. 1 and 2.

Referring now more specifically to the drawings, the numeral 10 generally designates a conventional form of motorboat including an inboard-outboard drive assembly referred to in general by the reference numeral 12 and supported from the transom 14 of the motorboat 10. The assembly 12 includes a drive unit referred to in general by the reference numeral 16 which is oscillatable both about a vertical axis and a horizontal axis and the drive unit may be seen to include a marine propeller 18 drivable about a horizontal axis and a cavitation plate 20 spaced above and extending over the marine propeller 18. In addition, the drive unit 16 includes a pair of opposite side rearwardly disposed mounting locations in the form of fasteners 22 to which the rear ends of a pair of opposite side hydraulic cylinders 24 are secured. In addition, the upper extremity of the drive unit 16 includes a central upper anchor lug 26. The anchor lug 26 is sometimes utilized to provide a location to which a tension member may be secured for maintaining the lower end of the drive unit 16 pivoted rearwardly and upwardly about the horizontal axis of oscillation of the drive unit 16.

The speed control is referred to in general by the reference numeral 28 and includes an upstanding guide frame referred to in general by the reference numeral 30. The frame 30 includes a pair of transversely spaced apart and opposing vertically extending side straps 32 and 34 and a pair of upper and lower rear straps 36 and 38 are secured to and extend between the upper and lower portions of the rear edges of the side straps 32 and 34. In addition, the guide frame 30 includes an upper forward angle iron 40 including a forwardly projecting horizontal flange 42 and a depending vertical flange 44 which is secured to the upper portions of the forward edges of the side straps 32 and 34. Further, a lower angle iron 46 is also provided and includes a lower forwardly projecting horizontal flange 48 and an upper upwardly projecting vertical flange 50 secured to and between the lower portions of the forward edges of the side straps 32 and 34.

A pair of forwardly and downwardly convergent legs 52 and 54 have their upper ends secured to the opposite ends of the lower horizontal flange 48 and their lower ends anchored to opposite side portions of the drive unit 16 by means of the fasteners 22. In addition, the guide frame 30 includes a pair of opposite side forwardly projecting mounting ears 56 and 58 secured to the remote side surfaces of the side straps 32 and 34 a spaced distance below their upper ends and the forwardly projecting ends of the ears 56 and 58 have the upper rear ends of a pair of forwardly convergent arms 60 and 62 secured thereto by means of suitable fasteners 64. The forward ends of the arms 60 and 62 are secured to opposite sides of the anchor lug 26 by means of a fastener 66 secured through the arms 60 and 62 as well as the anchor lug 26.

As can best be seen from a comparison of FIGS. 1, 2 and 5 of the drawings, it may be seen that the forward edge portion of the upper horizontal flange 42 has an apertured upstanding mounting flange 68 secured thereto intermediate its opposite ends. A stop pin 70 including a thumb-engageable head 72 and a cylindrical shank portion 74 has its shank portion slidably and rotatably received through the aperture 76 in the flange 68 and the shank portion 74 has an abutment washer 78 fixedly mounted thereon a spaced distance along the shank portion 74 from the head 72. Also, a coil spring 80 is disposed on the shank portion 74 between the abutment washer 78 and the mounting flange 68.

The upper ends of the side straps 34, the upper strap 36 and the upper angle iron 40 define a vertically extending opening aligned with a vertically extending opening defined between the lower ends of the side straps 32 and 34, the lower rear strap 38 and the lower angle iron 46. An elongated panel member 82 is provided and slidable through the aligned openings defined by the guide frame 30. The panel member 82 is of a length whereby its lower end will be disposed adjacent a horizontal plane containing the lowermost extremity of the drive unit 16 when the upper end of the panel member 82 projects above the strap 36 and the angle iron 40 and the panel member 82 is freely longitudinally reciprocal relative to the guide frame 30.

The upper end of the panel member 82 is provided with a plurality of vertically spaced centrally disposed apertures 84 which are registrable with the free end of the shank portion 74 when the stop pin 70 is fully retracted to the left as viewed in FIG. 5 of the drawings. In addition, the panel member 82 includes an additional aperture 86 slightly below its vertical center which is also registrable with the shank portion 74. From FIG. 1 of the drawings it may be seen that when the panel member 82 is in its upper position with the aperture 86 aligned with the stop pin 70 the lower end of the panel member 82 is spaced appreciably above the cavitation plate 20. Of course, the end of the shank portion 74 on the side of the abutment washer 78 remote from the head 72 may be projected into the aperture 86 in order to retain the panel member 82 in its upper position. Further, from FIG. 2 of the drawings it may be seen that when the panel member 82 is positioned in a lower position with the shank portion 74 projecting into either one of the apertures 84 the lower end of the panel member 82 will be disposed in horizontal registry with and slightly behind the marine propeller 18. This of course will throttle the rearward discharge of water from the marine propeller 18 during operation of the motorboat 10 and effectively reduce the speed of the motorboat 10 at any given propeller r.p.m., although it is to be understood that the panel member 82 will be lowered only when the marine propeller is to be driven at a reasonably slow speed. Further, the speed of the motorboat 10, at any low propeller r.p.m., may be varied by vertically shifting the panel member 82 to any one of its lower positions determined by the various apertures 84.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

We claim:

1. In combination with the outdrive unit of an inboard-outboard drive assembly and including a rotary propeller, a guide, means supporting said guide from an upper portion of said unit, an upstanding elongated panel assembly guidingly supported from said guide for vertical shifting relative to said guide and said unit between an upper position with the lower end of the panel disposed above a horizontal plane containing the upper extremities of said propeller and a lower position with said lower end adjacent a horizontal plane containing the lower extremities of said propeller, said outdrive unit including opposite side rearwardly disposed mounting locations to which the rear ends of a pair of hydraulic cylinders are secured, said guide including opposite side lower portions also secured to said mounting location, said outdrive unit further including a central upper anchor location, said guide including an upper portion having opposite side areas, and a pair of forwardly convergent mounting arms whose rear ends are secured to said opposite side areas and whose forward ends are secured to said central anchor location.

2. The combination of claim 1 wherein said outdrive unit includes a generally horizontal cavitation plate disposed above the first mentioned plane, said lower end, when said panel assembly is in said upper position is disposed above said cavitation plate.

3. The combination of claim 1 wherein said means includes means removably securing said guide to said outdrive unit.

4. The combination of claim 1 wherein said guide is free of portions thereof disposed below a horizontal plane containing said upper extremities.

5. The combination of claim 1 wherein said guide includes upper and lower portions defining aligned openings through which said panel assembly is longitudinally reciprocal, said upper portion and said panel assembly including coacting means for selectively releasably retaining said panel assembly in said upper and lower positions.

6. In combination with the outdrive unit of an inboard-outboard drive assembly and including a rotary propeller, a guide, means supporting said guide from an upper portion of said unit, an upstanding elongated panel assembly guidingly supported from said guide for vertical shifting relative to said guide and said unit between an upper position with the lower end of the panel disposed above a horizontal plane containing the upper extremities of said propeller and a lower position with said lower end adjacent a horizontal plane containing the lower extremities of said propeller, said guide including an upstanding frame defining a generally vertical passage extending therethrough in which said panel assembly guidingly reciprocal, said means supporting said guide from said unit including a pair of upstanding generally straight forwardly and downwardly inclined lower legs carried by opposite sides of the lower end portion of said frame and whose lower ends are supported from opposite side portions of said unit at points spaced intermediate the upper and lower ends of said unit as well as a pair of generally horizontal substantially straight arms including rear ends spaced appreciably above the rear ends of said lower legs and secured to opposite sides of the upper end portion of said frame and forward ends secured to an upper portion of said unit spaced appreciably above the forward ends of said lower legs.

7. The combination of claim 6 wherein the rear ends of said arms are secured to said frame for angular adjustment about axes extending between said rear ends.

8. The combination of claim 7 wherein said outdrive unit includes a generally horizontal cavitation plate disposed above the first mentioned plane, said lower end, when said panel assembly is in said upper position is disposed above said cavitation plate.

9. The combination of claim 8 wherein said guide is free of portions thereof disposed below a horizontal plane containing said upper extremities.